W. H. DAILEY & H. W. GOODE.
BEET HARVESTING MACHINE.
APPLICATION FILED OCT. 11, 1913.

1,126,716.

Patented Feb. 2, 1915.
2 SHEETS—SHEET 2.

WITNESSES:

INVENTORS
William H. Dailey.
Henry W. Goode.
By Owen & Owen,
Their attys.

UNITED STATES PATENT OFFICE.

WILLIAM H. DAILEY AND HENRY W. GOODE, OF VAN WERT, OHIO, ASSIGNORS TO THE VAN WERT BEET HARVESTER COMPANY, OF VAN WERT, OHIO, A CORPORATION OF OHIO.

BEET-HARVESTING MACHINE.

1,126,716.   Specification of Letters Patent.   Patented Feb. 2, 1915.

Application filed October 11, 1913. Serial No. 794,578.

*To all whom it may concern:*

Be it known that we, WILLIAM H. DAILEY and HENRY W. GOODE, citizens of the United States, and residents of Van Wert, in the county of Van Wert and State of Ohio, have invented a certain new and useful Beet-Harvesting Machine; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to the topping mechanism of beet harvesting machines, but is not restricted to such use as it may be used in any connection for which it may be adapted or appropriate.

In the harvesting of sugar beets it is quite important, if not essential, to cut off substantially all the top portions of beets which are exposed to the sun and weather, and as the depth of such exposed portions varies considerably for successive beets, it has heretofore been necessary, so far as we are aware, to retop the beets by hand after being initially topped and dug, thus entailing a considerable amount of extra expense for such work.

The object of our invention is the provision, in combination with a gage shoe and cutter of machines of this character, of simple and efficient means for effecting a relative automatic adjustment of said shoe and cutter to vary the space between their adjacent edges as the gage shoe rides over the tops of successive beets having exposed portions of various depths, whereby more or less of the beet top will be cut away as the beets project a greater or less distance above the ground.

Figure 1:
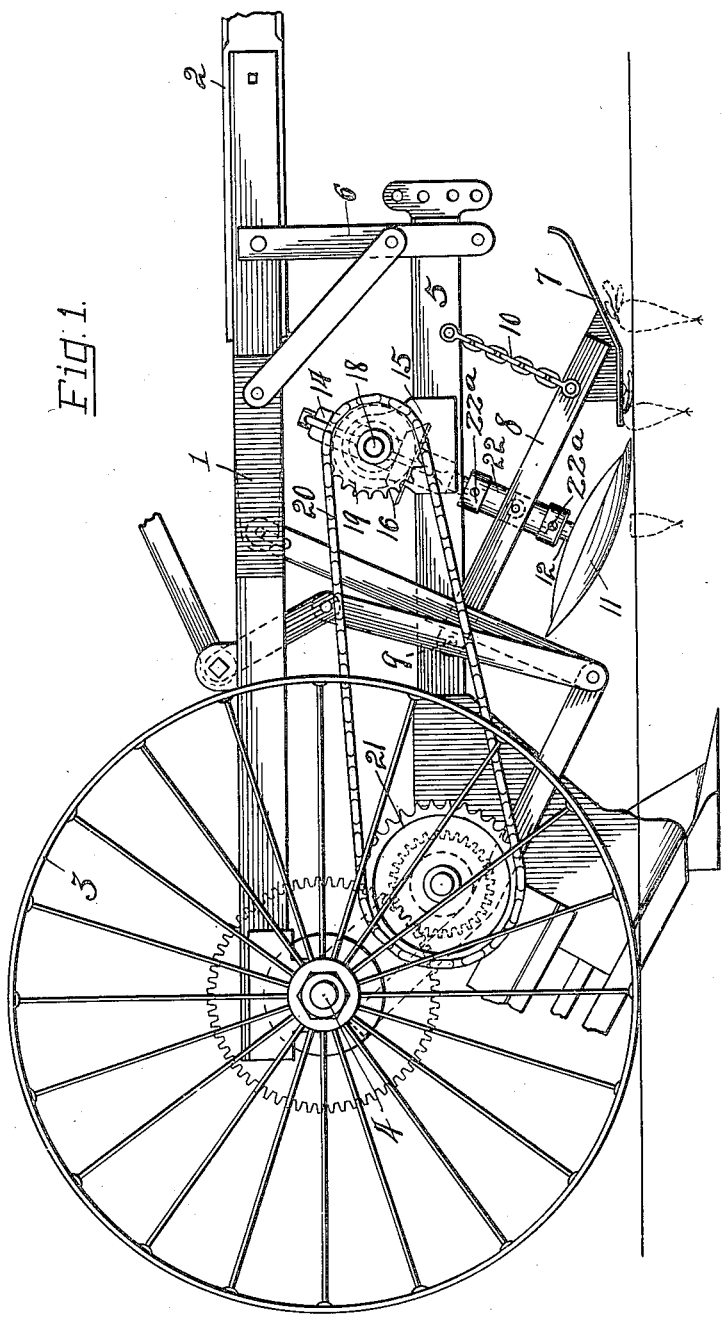
Figure 2:
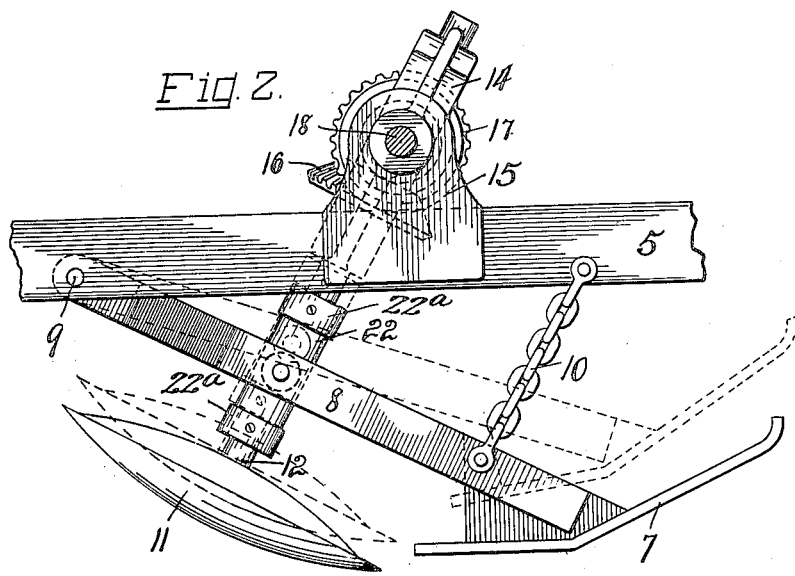
Figure 3:
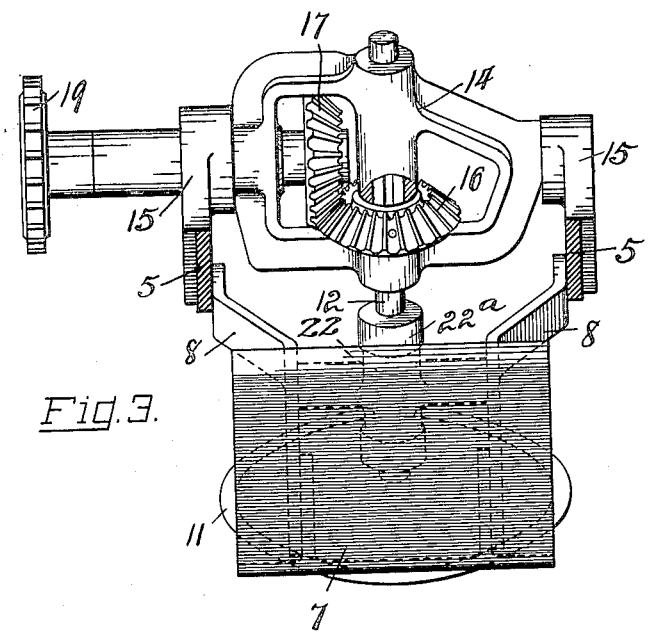

The invention is fully described in the following specification, and while, in its broader aspect, it is capable of embodiment in numerous forms, a preferred embodiment thereof is illustrated in the accompanying drawings, in which, Figure 1 is a side elevation of a machine embodying our invention with portions broken away, Fig. 2 is an enlarged side elevation of the portion of the machine comprising the invention with the relatively movable parts shown in different positions in dotted and full lines, and Fig. 3 is a front sectional elevation of the parts shown in Fig. 2.

Referring to the drawings, 1 designates the main frame portion of the machine to which the customary tongue 2 is attached and which is supported at its rear end by a pair of wheels 3, one only of which is shown, and a connecting axle 4. A supplemental frame comprising the two transversely spaced longitudinally extending bars 5—5 is carried at its rear end in any suitable manner by the axle 4 and has its forward end supported by a yoke or frame part 6 depending from the frame 1. As the construction and manner of mounting and supporting the supplemental frame 5 forms no part of our present invention the same will not be specifically described.

The gage shoe which is intended to ride over the tops of the beets is designated 7 and is carried at the forward end of a pair of arms or bars 8, which extend rearward and upward from said shoe and pivot at their rear ends to the respective side bars 5 of the supplemental frame, as at 9. A chain or other suitable means 10 connects the forward end portion of the bars 8 or one of them to the supplemental frame 5—5 to limit the lowering of the gage shoe relative to such frame.

A topping member or cutter 11, in the present instance of the rotary disk type, or it may be of any suitable style as desired, is carried at the rear of the gage shoe 7 in spaced relation thereto by a shaft 12. This shaft is inclined relative to a vertical plane to place the cutter on an incline, as shown, and extends upward from the cutter being mounted at its upper end for free axial and rotary movements in a bearing-head or yoke 14, which is disposed intermediate the supplemental frame bars 5—5 and is journaled or trunnioned at its ends in suitable bearings 15 rising from the respective bars 5, thus enabling the shaft to have swinging movements longitudinally of the machine with the yoke trunnions or axis as its swinging axis. A bevel-gear 16 is feathered to the shaft 12 within a portion of the bearing yoke 14 and coacts with such yoke to prevent a longitudinal movement of the shaft therein. A companion bevel-gear 17 is carried by a drive shaft 18 within a portion of the bearing-yoke in mesh with the gear 16. The shaft 18 projects axially from one side of the yoke and, in the present instance, carries a sprocket-wheel 19 at its outer end which is connected by a chain 20 to a drive sprocket-wheel 21 that is suitably connected to and driven from the axle 4, which is intended to turn with the wheels 3. It will, of course, be understood that any suitable or convenient means may be provided for driving the shaft 12.

A cross-head 22 is pivotally carried by the gage-shoe bars 8 between the same for vertical swinging movements relative thereto and is loosely sleeved at its central portion around the shaft 12, being prevented from longitudinal movements thereon by collars 22ª, 22ª, which are fixed to the shaft above and below the yoke sleeve. It is evident that this manner of mounting the cutter shaft 12 and connecting such shaft and the gage-shoe 7 will permit the gage-shoe, as it passes over the tops of beets projecting different distances above the ground, to have rising and falling movements relative to the cutter and consequently vary the vertical space between the rear edge of the gage-shoe and the front or cutting edge of the cutter, due to the shoe being spaced a greater distance than the cross-head 22 from the common pivot 9, so that the cutter will be permitted to take a deeper bite of a beet having a deep exposed portion than of a beet having a lesser exposed portion.

We wish it understood that our invention is not limited to any specific construction or arrangement of the parts except in so far as such limitations are specified in the claims.

Having thus described our invention, what we claim as new and desire to secure by Letters Patent, is,—

1. In a machine of the class described, a cutter member mounted for axial, rotary and swinging movements, and gage means having connection with said cutter and operable to vary the depth of cut as it passes over articles of uneven heights.

2. In combination, a frame, a gage means pivoted for swinging movements to said frame, and a cutter carried by said means intermediate its pivot and its article coacting portion whereby the article coacting portion of the gage means and the cutter will have different lengths of swinging movements when the means is swung on its pivot.

3. In combination, a frame, gage means pivoted to and extending forward from a part of said frame for swinging movements relative thereto, a cutter carried for rotary and swinging movements by said means and disposed intermediate the pivot and article coacting portion of the means for relative movements when the means is swung on its pivot.

4. In combination, a frame, gage means pivoted to said frame for swinging movements relative thereto, a shaft carried by said means intermediate its pivot and article coacting portion for rotary and swinging movements relative thereto, means guiding the axial movements of said shaft and serving as a swinging pivot therefor, and a cutter carried by the shaft adjacent to the free end of the gage means, said cutter and the free end portion of the gage means having the space therebetween varied upon a swinging movement of the gage means.

5. In combination, a frame, a bearing member, and a gage means carried for relative swinging movements by the frame and having their swinging axes parallel, a shaft mounted in said member for rotary and axial movements relative thereto and for swinging movements therein, said shaft being pivotally connected to the gage means intermediate its swinging axis and free end whereby the axial and swinging movements of the shaft are controlled by the movements of said means, and a cutter carried by the shaft.

6. In combination, a frame, a gage shoe having arms extending therefrom and pivotally connected to the frame, a shaft pivotally connected to said arms intermediate the pivot thereof and the gage shoe and having its axis intersecting the plane of projection of said arms, a cutter carried by the lower end of said shaft, and means guiding said shaft for axial movements and serving as a swinging pivot therefor whereby the gage shoe and cutter will have relative movements to vary the space therebetween when the shoe is swung on its pivot.

7. In combination, a frame, a gage shoe carried for swinging movements by said frame, a member pivotally carried by said shoe intermediate its pivot and free end, a cutter carried by said member in adjacent relation to the article coacting portion of said shoe, and means guiding said member to cause the member and shoe to have relative swinging movements when the shoe is swung on its pivot.

8. In combination, a frame, a gage shoe pivotally carried by said frame and adapted to have rising and falling movements as it passes over articles of unequal height, a shaft carried for rotary and swinging movements by said shoe intermediate its article coacting portion and its pivot, a cutter carried by the lower end of such shaft, means swingingly carried by the frame and forming a guide for said shaft, and means for driving said shaft in any position of its movement.

In testimony whereof, we have hereunto signed our names to this specification in the presence of two subscribing witnesses.

WILLIAM H. DAILEY.
HENRY W. GOODE.

Witnesses:
CLEM V. HOKE,
JENNIE WILKINSON.